(12) United States Patent
Phillips et al.

(10) Patent No.: US 6,203,676 B1
(45) Date of Patent: Mar. 20, 2001

(54) IONIC CONDUCTION DEVICE

(75) Inventors: Robert John Phillips, Honiton; Adrian Simons, Yeovil; Jonathan Andrew Lane, London, all of (GB); David Waller, Porsgrunn (NO); John Derrick Sirman, Tonawanda, NY (US); John Anthony Kilner, Ewall (GB)

(73) Assignee: Normalair-Garrett (Holdings) Limited, Somerset (GB)

( * ) Notice: Subject to any disclaimer, the term of this patent is extended or adjusted under 35 U.S.C. 154(b) by 0 days.

(21) Appl. No.: 09/293,104

(22) Filed: Apr. 16, 1999

(30) Foreign Application Priority Data

Apr. 18, 1998 (GB) .................................................. 9808133

(51) Int. Cl.⁷ ............................... C25B 9/00; H01M 8/00
(52) U.S. Cl. ............................. 204/256; 204/258; 429/12
(58) Field of Search ................................... 204/256, 258; 429/12, 34

(56) References Cited

U.S. PATENT DOCUMENTS

| | | | |
|---|---|---|---|
| 4,853,100 | * 8/1989 | Hsu | 204/256 |
| 5,186,806 | * 2/1993 | Clark et al. | 204/258 X |
| 5,298,138 | 3/1994 | Nachles et al. | 204/267 |
| 5,649,983 | 7/1997 | Akagi | 29/623.1 |
| 5,770,326 | * 6/1998 | Limaye | 204/258 X |

FOREIGN PATENT DOCUMENTS

| | | | |
|---|---|---|---|
| 40 16 157 | 12/1990 | (DE) | H01M/8/12 |
| 0 501 401 | 9/1992 | (EP) | H01M/8/24 |
| 0 698 936 | 2/1996 | (EP) | H01M/8/24 |
| 0 706 229 | 4/1996 | (EP) | H01M/8/10 |

OTHER PUBLICATIONS

European Search Report for Application No. EP 99 10 7669, dated Nov. 18, 1999.

* cited by examiner

Primary Examiner—Donald R. Valentine
(74) Attorney, Agent, or Firm—Marshall, O'Toole, Gerstein, Murray & Borun

(57) ABSTRACT

An ionic conduction device comprises a stack of layers, each layer comprising an electrolyte membrane having a pair of opposed surfaces, a gas permeable electrode in contact with each opposed surface, and there being a plurality of interconnects in electrical contact with the electrodes of the layers, to provide electrical continuity through the stack, wherein there is at least one gas flow path though the layers and the interconnects of the stack.

13 Claims, 3 Drawing Sheets

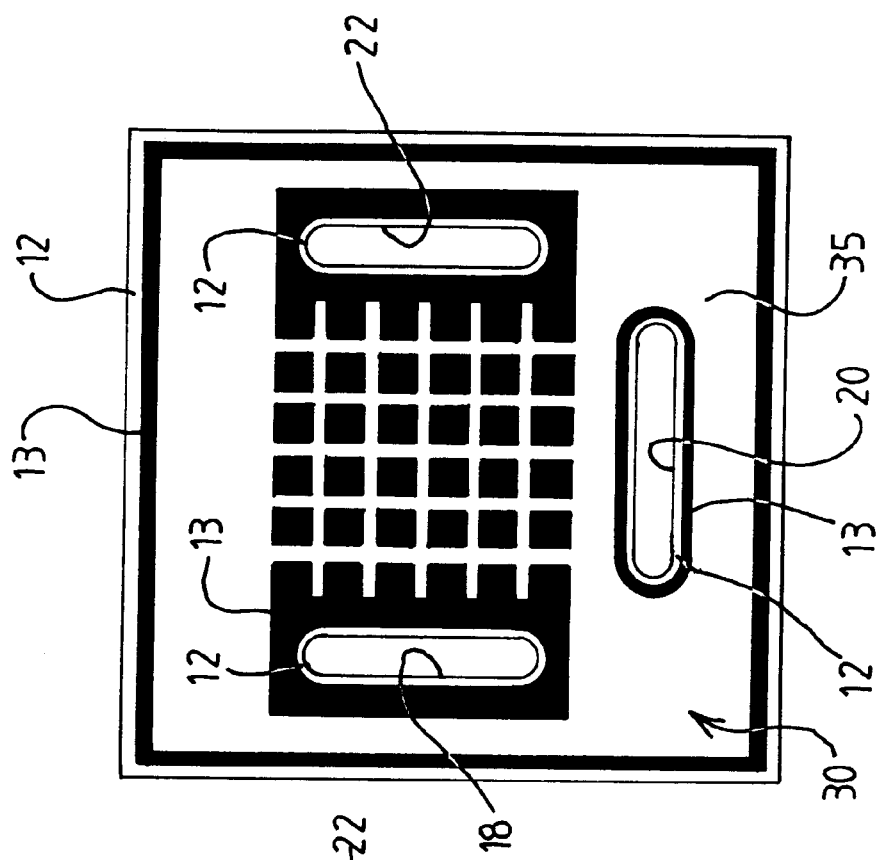

IONIC CONDUCTION DEVICE

BACKGROUND OF THE INVENTION

This invention relates to an ionic conduction device which may be used for examples only, as an oxygen generating device or as a fuel cell.

DESCRIPTION OF THE PRIOR ART

Such devices are known which comprise a stack of layers, each layer comprising a membrane of a suitable electrolyte, having a pair of opposed surfaces with an electrode in contact with each opposed surface. Such layers are also known as tri-layers by virtue of their three main component construction. The layers are conventionally separated by interconnects which also provide for gas flow throughout the device, and electrical continuity throughout the device.

For example in an oxygen generating device, the interconnects may provide for an air flow from a plenum along one side of the stack, over one of opposed faces of the layers, oxygen passing through the layers to the other of the opposed faces of the layers, the oxygen depleted gas being collected in a plenum along another of the stack sides, whilst the oxygen generated at the other of the faces of the layers, being collected in another plenum along yet another side of the stack.

Such devices are complex to make, requiring a large number of high quality components to be assembled. For example flatness of the components to a high degree is necessary for a satisfactory device to be provided.

One example of such an ionic conduction device which suffers from this drawback is described in U.S. Pat. No. 5,298,138-A, and another in U.S. Pat. No. 5,649,983-A. In both of these examples, the device construction is complex, and thus the devices are costly to produce.

SUMMARY OF THE INVENTION

According to one aspect of the invention we provide an ionic conduction device comprising a stack of layers, each layer comprising an electrolyte membrane having a pair of opposed surfaces, a gas permeable electrode in contact with each opposed surface, and there being a plurality of interconnects in electrical contact with the electrodes of the layers, to provide electrical continuity through the stack, wherein there is at least one gas flow path though the layers and the interconnects of the stack.

Thus in contrast with previously known devices, gas flow is through the layers and interconnects of the stack rather than though the stack to and from plenems along the sides of the stack. This considerably facilitates manufacture and construction and thus results in a substantial cost saving.

Most conveniently the gas flow path through the layers and interconnects is provided by passage means, the passage means opening at one face of the layer into a space between the layer and the adjacent interconnect, and the passage means extending from a second face of the layer to the next adjacent interconnect.

For example, there may be provided between the interconnects and the layers at the first and second faces of the layers, spaces, there being a first gas flow path through the layers and interconnects of the stack which permits of gas flow through the stack, and the first gas flow path communicating with the spaces at the first of the opposed faces of the layers, and a second gas flow path through the layers and interconnects of the stack which permits of gas flow through the stack, and the second gas flow path communicating with the spaces at the second of the opposed faces of the layers.

Thus the first and second gas flow paths may be kept physically separate from one another whilst ions of gas may pass through the electrolyte membrane to provide for gas transfer from one of the gas flow paths to the other.

The device may be used as either an oxygen generating device or a fuel cell, for examples only. In each case there may be provided a third gas flow path through the layers and interconnects of the stack, the third gas flow path communicating with the spaces at the first of the opposed faces of the layers.

In the case of an oxygen generating device, the first gas flow path may be for air, and the second gas flow path for the generated oxygen. The third gas flow path where provided, may be for oxygen depleted air. In the case of a fuel cell the first gas flow path may be for a fuel gas such as hydrogen, the second gas flow path may be for a gas comprising oxygen, and the third gas flow path may be for exhaust gas.

In each case, the passage means through the layers will necessarily comprise edges of the electrolyte membranes and electrodes. To prevent gas leakage from one of the flow paths to the other or another of the flow paths, particularly through the electrode material, means may be provided to seal at least the edges of the electrodes in the passage means to prevent gas leakage from one gas flow path to the other.

Preferably, between the interconnects and the electrodes of the layers there are provided films of a conducting material which may serve to improve the electrical connection between the interconnects and the electrodes and facilitate gas sealing at that interface.

The stack may comprise four sides, and first and second ends, the gas flow paths extending through the stack in a direction between the first and second ends thereof, and the first gas flow path though the stack may be provided adjacent one side of the stack, the second gas flow path adjacent a second side of the stack and the third gas flow path, where provided, adjacent a third side of the stack.

At at least one of the sides of the stack and/or in the or at least one of the gas flow paths through the stack, the layers may provide a stepped configuration with the electrolyte membrane extending outwardly at the side and/or inwardly of the gas flow path respectively, beyond the electrodes in contact with the opposed surfaces of the electrolyte membrane, and the electrodes may each extend outwardly at the side and/or inwardly of the gas flow path respectively, beyond the interconnects in electrical contact with the electrodes.

Where there are provided films of a conducting material between the interconnects and the electrodes, the electrodes may extend outwardly at the side and/or inwardly of the gas flow path respectively, beyond the films, and the films may extend outwardly at the side and/or inwardly of the gas flow path respectively, beyond the interconnects.

According to a second aspect of the invention we provide an ionic conduction device comprising at least one layer comprising an electrolyte membrane having a pair of opposed surfaces, a gas permeable electrode in contact with each opposed surface, and an interconnect in electrical contact with each of the electrodes, wherein at at least one of the sides of the stack the layer provides a stepped configuration with the electrolyte membrane extending outwardly beyond the electrodes in contact with the opposed surfaces of the electrolyte membrane, and the electrodes each extending outwardly beyond the interconnects in electrical contact with the electrodes.

According to a third aspect of the invention we provide a method of operating an ionic conduction device comprising a stack of layers, each layer comprising an electrolyte membrane having a pair of opposed surfaces, a gas permeable electrode in contact with each opposed surface, and there being a plurality of interconnects in electrical contact with the electrodes of the layers, to provide electrical continuity through the stack, the method comprising feeding gas to an end of the stack, and causing the gas to flow along the stack between the ends thereof.

BRIEF DESCRIPTION OF THE DRAWINGS

The invention will now be described with reference to the accompanying drawings in which:

FIG. 4 is a detailed diagrammatic plan view showing the alternate sides of one of the layers of the device of FIG. 2.

DESCRIPTION OF THE PREFERRED EMBODIMENTS

Figure 1:
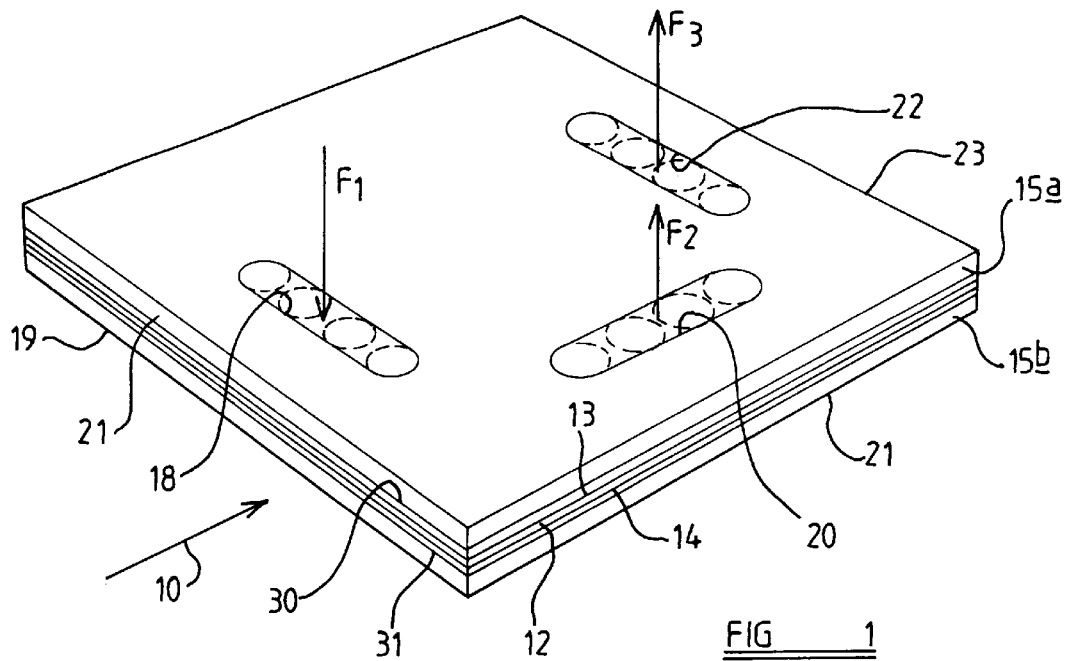
FIG. 1 is an illustrative perspective view of part of an ionic conduction device in accordance with the invention.

Referring to FIG. 1 of the drawings there is shown an illustrative perspective view of part of an ionic conduction device 10 in accordance with the invention.

The part of the device 10 shown comprises a single layer L1, commonly referred to as a tri-layer, comprising an electrolyte membrane 12 such as for example only, Cerium Gadolinium Oxide, and at each face of the membrane 12, there is provided in contact with the membrane an electrode 13, 14. The electrodes 13, 14 are gas porous for a purpose hereinafter explained.

A plurality of such tri-layers L1 are in practice, arranged in a stack, with interconnects 15a, 15b etc. separating the layers in the stack. The interconnects may be metallic e.g. made of Haynes alloy 230, or another suitable material.

In the case of an oxygen generating device, air is fed to each of the first faces 30 of the layers L1, which all face in the same direction, whilst an electrical potential is applied between first and second ends of the stack. As a result an electrochemical process occurs whereby oxygen gas molecules in the air, diffuse through the electrodes 13 (which are the cathodes), and are reduced to oxygen anions. These oxygen anions pass through the ceramic membranes 12 of the layers L1 where they reform into oxygen gas molecules and diffuse through the electrodes 14 (which are the anodes) at the opposite faces 31 of the layers L1.

Conventionally the air is fed to each of the one faces 30 of each of the layers L1 simultaneously from an air source e.g. a plenum located at one side 19 of the stack. The oxygen depleted air is collected at another side 23 of the stack e.g. in a second plenum or is otherwise exhausted, and the oxygen is collected e.g. in another plenum at yet another side 21 of the stack.

Complex seals are conventionally necessary to prevent the various gas flows mixing.

In accordance with the present invention rather than the air being provided to the one faces 30 of each of the layers L1 of the stack from a side 19 of the stack, a gas flow path F1 is provided through the layers L1 of the stack, by passage means 18. Such passage means 18 may comprise one or more slots adjacent the one side 19 of the stack as shown in full lines in FIG. 1, or a plurality of smaller openings as indicated in dotted lines in FIG. 1.

In each case, such passage means 18 will extend throughout all or substantially all of the length of the stack from one end E1 to the opposite end E2 of the stack.

Further, rather than providing for the oxygen to be collected at a side 21 of the stack, in accordance with the invention, a second gas flow path F2 is provided through the stack by a further passage means 20 which may again comprise one or more slots or a plurality of smaller openings, the passage means 20 again extending throughout all or substantially all the length of the stack, but adjacent the second side 21 of the stack.

Additionally, rather than providing for the oxygen depleted gas to be collected at a side 23 of the stack or otherwise exhausted from the side 23 of the stack, in accordance with the invention, a third gas flow path F3 is provided through the stack by a yet further passage means 22 which may again comprise one or more slots or plurality of smaller openings, the passage means 22 again extending throughout all or substantially all the length of the stack, but adjacent the third side 23 of the stack.

Thus there is no need to provide plenums along the sides 19, 21, 23 of the stack, and furthermore, for the reasons hereinafter explained, tolerances such as flatness of the layers, are less critical than with conventional arrangements.

Figure 2:
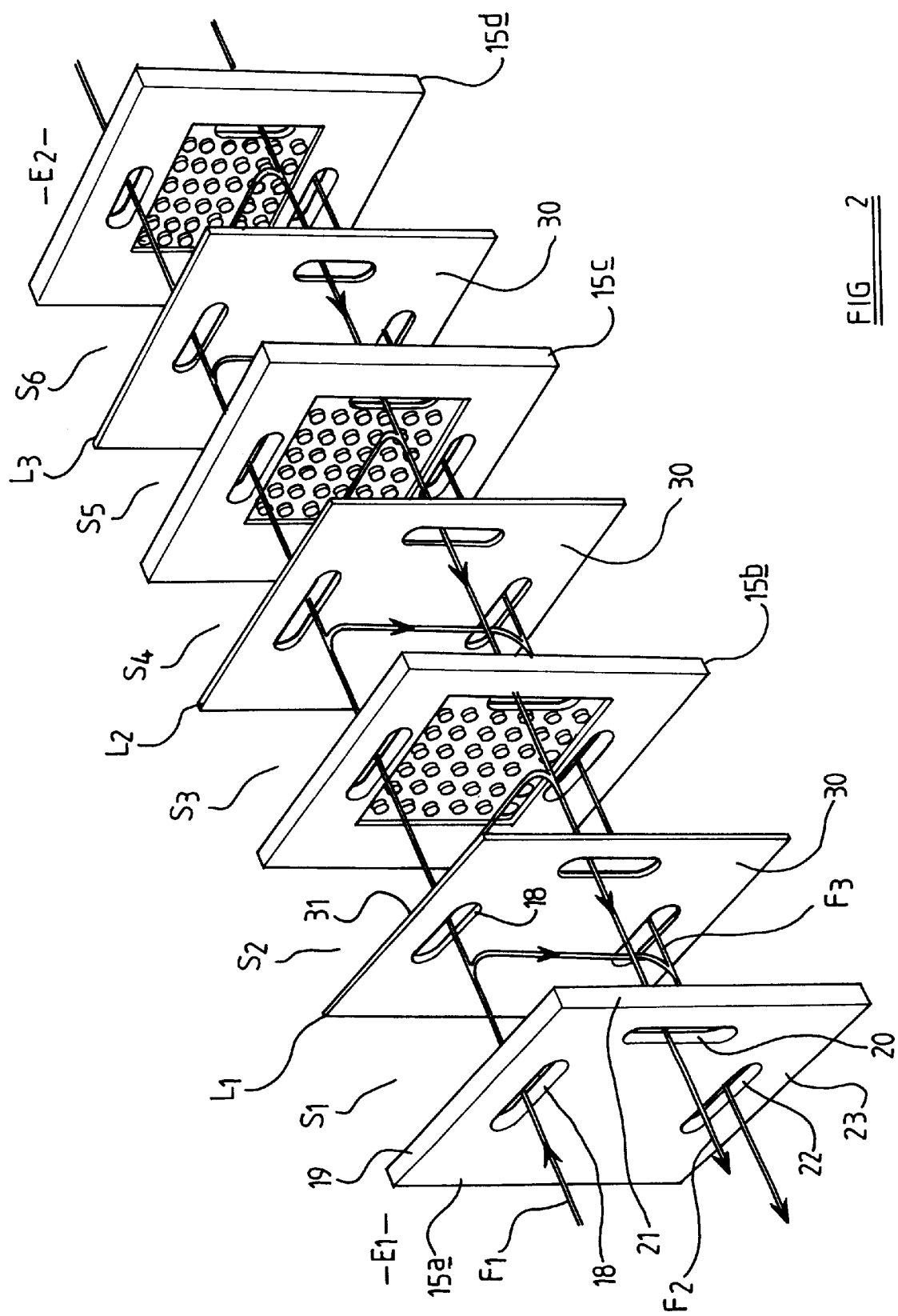
FIG. 2 is an exploded diagrammatic perspective view of an oxygen generating device in accordance with the invention.

Referring now to FIG. 2, a stack construction is diagrammatically shown.

The stack comprises in this example, three tri-layers L1, L2, L3 of electrolyte membrane and electrodes 13, 14, the layers L1–L3 being separated by and sandwiched between four interconnects 15a, 15b, 15c, 15d.

By virtue of the construction of the interconnect 15a, there is provided a space S1 between the interconnect 15a and the first L1 of the three layers L1–L3, at a first face 30 of the layer L1, which space S1 communicates with the first gas flow path F1 of air, and the third gas flow path F3 for oxygen depleted air. However, the construction of the interconnect 15a prevents communication between the space S1 and the second gas flow path F2.

By virtue of the construction of the next interconnect 15b, there is provided a space S2 at the opposite face 31 of the layer L1, which space S2 communicates with the second gas flow path F2 for the oxygen, only. However, the second interconnect 15b of the stack, like the first interconnect 15a, provides a space S3 between the second interconnect 15b and the second layer L2 which provides for communication between the first gas flow path F1 for the air, the space S3 and the third gas flow path F3 for the oxygen depleted air, and so on for all the interconnects 15a to 15d and tri-layers L1 to L3 of the stack.

Thus every alternate space S1, S3, S5, communicates with both the first F1 and third F3 flow paths, whilst the remaining alternate spaces S2, S4 and S6 communicate only with the second gas flow path S2.

In a practical arrangement there is likely to be more than three tri-layers L1, L2, L3 and four interconnects 15a to 15d.

The device 10 is operated at an elevated temperature of typically 960° C. and an electrical potential, of perhaps 100V, is applied from one end E1 of the stack to the other end E2. Thus there will be a potential difference across each of the layers L1 to L3 of the stack, electrical continuity being provided by the interconnects 15a to 15d.

Figure 3:
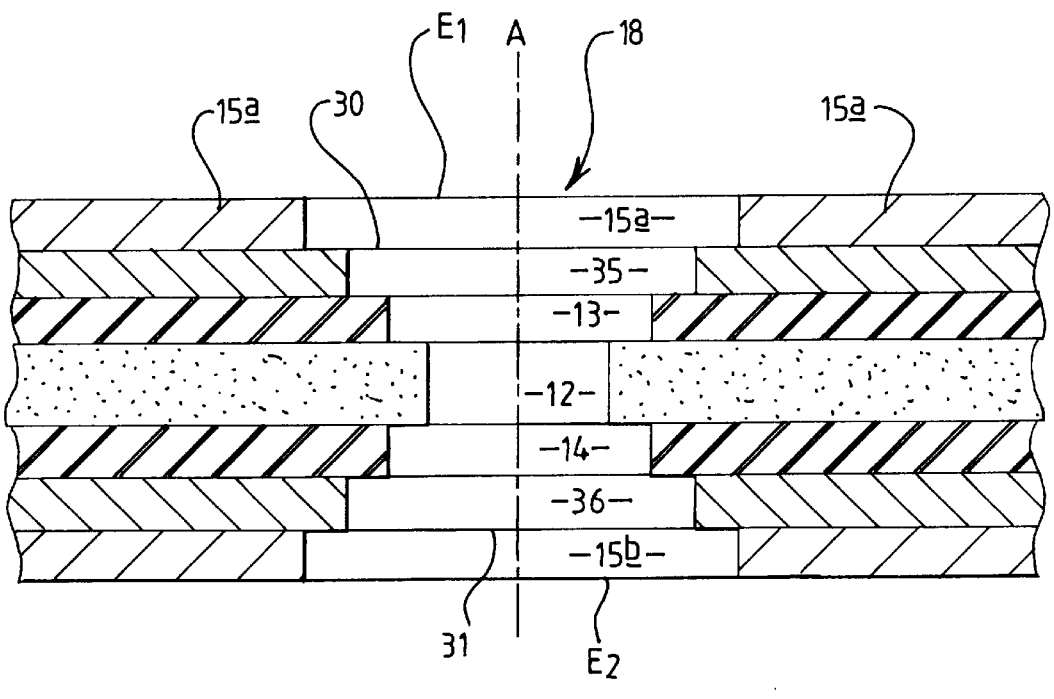
FIG. 3 is a detailed diagrammatic cross-sectional view of an opening through a layer of the device shown and described with reference to FIG. 2.

FIG. 3 shows a cross sectional view through part of the passage means 18 of the device which provides the first gas flow path F1, although it will be appreciated that the passage means 20, 22 which provide the second F2 and third F3 flow paths may be similarly constructed.

Within each passage means 18 it can be seen that the edge of the electrolyte membrane 12 projects towards an axis A of the passage means 18 the furthest distance. The edges of the electrodes 13, 14 project towards the axis A the next furthest distance, and the edges of the interconnects 15a, 15b the least furthest. Between the electrodes 13, 14 and the interconnects 15a, 15b it can be seen that there is an edge of a further component being a current collector 35, 36, the purpose of which will be explained below.

It will be appreciated that the gas is thus generally constrained to flow through the passage means 18 along axis A which is generally parallel the extent of the stack from end E1 to end E2. However, as the electrode 13, 14 material is gas porous, there is the possibility of gas escaping from the passage means 18 through the electrodes 13, 14. Such gas escape is not critical where it is appropriate for the gas to be on that particular side of the electrolyte membrane 12, for example in the case of the passage means 18, in space S1, or in the case of a passage means 22 for the oxygen depleted gas, in space S1, but for the oxygen flowing in a passage means 20, means may be provided to seal the edges of the electrodes 13, 14 or at least the flow path for the oxygen through the electrodes 13, 14 from the passage means 18 may be made as tortuous as possible to deter gas flow from the edges of the electrodes 13, 14.

One or more of the sides 19 and/or 21 and/or 23 and or the remaining side of the stack may be constructed in a stepped configuration similarly to the stepped configuration within the passage means 18 shown and described with reference to FIG. 3, with the electrolyte membrane 12 of the or each of the layers extending outwardly beyond the electrodes 13, 14 in contact with the opposed surfaces of the electrolyte membrabe 12, and the electrodes 13, 14 extending outwardly beyond the current collector films 35, 36 where provided, and the films 35, 36, or at least the electrodes 13, 14 extending outwardly beyond the adjacent interconnects 15a, 15b.

By virtue of the provision of the current collector films 35, 36 and the general arrangement of the layers as shown and described with reference to FIG. 3, the need for the component parts of the device to be critically flat is less demanding as the current collector components 35, 36 function as gaskets between the electrodes 13, 14 and interconnects 15a, 15b to provide for good sealing between the two. The stepped configuration of the layers simplify the manufacture of the device 10 generally and eliminate any need to insulate the various layers against short circuits.

It will be appreciated that to permit of communication between the first flow path F1 and the spaces S1, S3, S5, the interconnects 15a to 15d will be appropriately shaped (i.e. cut away) to face 30 of the tri-layer L1 and at the other first faces of the other tri-layers L2, L3 which face in the same direction, around the opening, whilst the interconnects 15a to 15d will be shaped to prevent air from the opening flowing into the spaces S2, S4, S6 in which the oxygen collects.

Referring now to FIG. 4 there is a more detailed but still diagrammatic illustration of the alternative faces 30, 31 of one L1 of the tri-layers L1 to L3.

The electrolyte membrane 13 can be seen at the periphery of the layer L1 shown, and also in areas not covered with other components.

On top of the electrolyte membrane 12 there is provided the appropriate electrode 13, 14. The electrodes 13, 14 may be deposited on the opposing surfaces of the membrane 12 by any suitable deposition technique, depending on the material from which the electrodes are made. For example the electrodes 13, 14 may be made of Lanthanum Strontium Cobalt Ferrite (LSCF) or another suitable material.

To assist electrical continuity throughout the device, and to aid gas sealing between the interconnects 15a to 15d and the layers L1, L2, L3, on each of the electrodes 13, 14 there is deposited a film of silver or another highly conductive material, which films provide the current collectors 35, 36 described with reference to FIG. 3. The current collectors 35, 36 only partially cover the electrodes 13, 14 so as to permit of diffusion of the gas through the electrodes 13, 14, and in this example it can be seen that the current collectors 35, 36 form a criss-cross pattern over the electrodes 13, 14.

The constructions of the passage means 18, 20 and 22 through the layer L1 which provide the gas flow paths F1 to F3 and as described with reference to FIG. 3 can be appreciated, as the edges of the electrolyte membrane 12 can be seen in FIG. 4 bordering the passage means 18, 20, 22, and the edges of the electrodes 13, 14 can be seen bordering the edges of the electrolyte membrane 12, with the edges of the silver or other current collector 35, 36 films bordering the edges of the electrodes 13, 14.

Various modifications may be made without departing from the scope of the invention. For example as indicated above, the actual number of tri-layers L1 to L3 will in practice usually be greater than three, the actual number depending on the design capacity of the device 10.

The shapes of the passage means 18, 20, 22 may be different from that described and may depend on the cross sectional area for gas flow required through the device 10. The passage means 18 and/or 20 and/or 22 may vary in cross section throughout the length of the device, from end to end, if desired.

The air, oxygen depleted air and the oxygen may be delivered to or collected from the same end E1 or E2 of the stack by one or more simply constructed and assembled manifolds or may be delivered to and collected from opposite ends E1/E2 or both ends of the stack, as desired.

Although the invention has been described with reference particularly to an ionic conduction device for generating oxygen, it will be appreciated that a similar construction may provide a novel fuel cell construction having the advantages of the ceramic oxygen generator described. In this case instead of air comprising the first gas flow F1, oxygen the second gas flow F2 and oxygen depleted air the third gas flow F3, the first gas flow may be fuel gas such as hydrogen, the second gas flow F2 may be for gas comprising oxygen, and the third gas flow F3 may be for exhaust gas.

However the construction may be utilised as an ionic conducting device for another use.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An ionic conduction device including a stack of layers, each layer including an electrolyte membrane having a pair of opposed surfaces, a gas permeable electrode in contact with each opposed surface, and there being a plurality of interconnects in electrical contact with the electrodes of the layers, to provide electrical continuity through the stack, wherein there is at least one gas flow path through the layers and the interconnects of the stack, and wherein at least one of the sides of the stack and/or in the or at least one of the gas flow paths through the stack, the layers provide a stepped configuration with the electrolyte membrane extending outwardly at the side and/or inwardly of the gas flow path respectively, beyond the electrodes in contact with the opposed surfaces of the electrolyte membrane, and the electrodes each extending outwardly of the side and/or inwardly of the gas flow path respectively, beyond the interconnects in electrical contact with the electrodes.

2. A device according to claim 1 wherein the gas flow path through the layers and interconnects is provided by a passage means, the passage means opening at one face of the layer into a space between the layer and the adjacent interconnect, and the passage means extending from a second face of the layer to the next adjacent interconnect.

3. A device according to claim 2 wherein between the interconnects and the layers at the first and second faces of the layers, there are provided spaces, there being a first gas flow path through the layers and interconnects of the stack which permits of gas flow through the stack, and the first gas flow path communicating with the spaces at the first of the opposed faces of the layers, and a second gas flow path through the layers and interconnects of the stack which permits of gas flow through the stack, and the second gas flow path communicating with the spaces at the second of the opposed faces of the layers.

4. A device according to claim 3 wherein the first and second gas flow paths are physically separate from one another and ions of gas pass through the layers to provide for gas transfer from one of the gas flow paths to the other.

5. A device according to claim 3 wherein there is provided a third gas flow path through the layers and interconnects of the stack, the third gas flow path communicating with the spaces at the one of the opposed faces of the layers.

6. A device according to claim 5 wherein the device is an oxygen generating device, the first gas flow path being for air, and the second gas flow path for the generated oxygen, and the third gas flow path where provided, being for oxygen depleted air.

7. A device according to claim 5 wherein the device comprises a fuel cell, the first gas flow path being for a fuel gas, the second gas flow path being for a gas comprising oxygen, and the third gas flow path where provided, being for exhaust gas.

8. A device according to claim 2 wherein the passage means through the layers include edges of the electrolyte membranes and electrodes.

9. A device according to claim 8 wherein means are provided to seal at least the edges of the electrodes in the passage means to prevent gas leakage from one gas flow path to the other.

10. A device according to claim 1 wherein the stack has four sides, and first and second ends, the gas flow paths extending through the stack in a direction between the first and second ends thereof, and the first gas flow path through the stack being provided adjacent one side of the stack, the second gas flow path adjacent a second side of the stack and a third gas flow path communicating with the spaces at the one of the opposed faces of the layers, where provided, adjacent a third side of the stack.

11. A device according to claim 1 wherein between the interconnects and the electrodes of the layers, there are provided films of a conducting material, the electrodes extending outwardly at the side and/or inwardly of the gas flow path respectively, beyond the films, and the films extending outwardly at the side and/or inwardly of the gas flow path respectively, beyond the interconnects.

12. An ionic conduction device including at least one layer including an electrolyte membrane having a pair of opposed surfaces, a gas permeable electrode in contact with each opposed surface, and an interconnect in electrical contact with each of the electrodes, and wherein at least one of the sides of the stack the layer provides a stepped configuration with the electrolyte membrane extending outwardly beyond the electrodes in contact with the opposed surfaces of the electrolyte membrane, and the electrodes each extending outwardly beyond the interconnects in electrical contact with the electrodes.

13. An ionic conduction device including a stack of layers, each layer including an electrolyte membrane having a pair of opposed surfaces, a gas permeable electrode in contact with each opposed surface, and there being a plurality of interconnects in electrical contact with the electrodes of the layers, to provide electrical continuity through the stack, wherein there is at least one gas flow path through the layers and the interconnects of the stack, and wherein between the interconnects and the electrodes of the layers there are provided films of a conducting material.

* * * * *